H. FARRAR.
CLEANER AND SCRAPER FOR GRAIN ELEVATORS.
APPLICATION FILED MAY 19, 1911.

1,037,184.

Patented Aug. 27, 1912.

Witnesses.
Nechia M. Russell.
Ernst O. Schroeder.

Henry Farrar. Inventor.
By _____ Attorney.

COLUMBIA PLANOGRAPH CO., WASHINGTON, D. C.

UNITED STATES PATENT OFFICE.

HENRY FARRAR, OF BUFFALO, NEW YORK.

CLEANER AND SCRAPER FOR GRAIN-ELEVATORS.

1,037,184.  Specification of Letters Patent.  Patented Aug. 27, 1912.

Application filed May 19, 1911. Serial No. 628,201.

*To all whom it may concern:*

Be it known that I, HENRY FARRAR, a citizen of the United States, residing at Buffalo, in the county of Erie and State of New York, have invented certain new and useful Improvements in Cleaners and Scrapers for Grain-Elevators.

This invention relates to improvements in cleaners or scrapers for the conveyer shafts of grain elevators, and primarily to a cleaner or scraper which is permanently attached to the conveyer belt and projects laterally therefrom within the conveyer shaft.

The main object of the invention is to provide means whereby the interior of the conveyer shafts are cleaned as the conveyer belt travels through the shafts.

The invention also relates to certain details of construction which will be hereinafter described and claimed.

Figure 1:
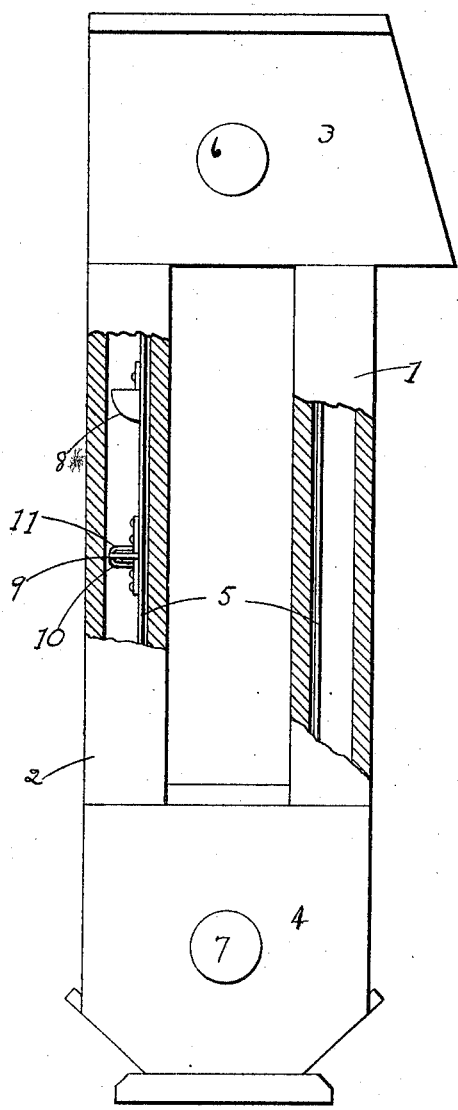
Figure 2:
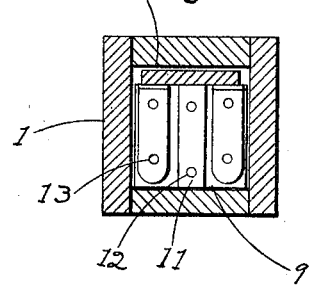
Figure 3:
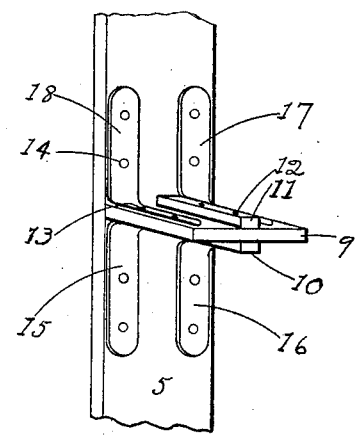
Figure 4:
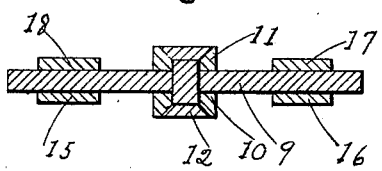

Figure 1 represents a side elevation of the conveyer shaft of a grain elevator portions thereof being broken and cut away in section to illustrate the conveyer belt with the improved cleaner or scraper attached thereto. Fig. 2 is a transverse section through the conveyer shaft 1 showing the scraper in plan view. Fig. 3 is a detached, enlarged, fragmentary perspective view of the conveyer belt with one of the improved cleaners or scrapers attached thereto. Fig. 4 is a vertical transverse section through the body of the scraper or cleaner.

In referring to the drawings in detail like numerals designate like parts in the adaptation of the invention shown in the accompanying drawings.

In Fig. 1 an elevator leg of conventional form is shown having two parallel vertical conveyer shafts 1 and 2, and upper and lower housings, 3 and 4. The conveyer belt, 5, is arranged within the shafts of the elevator leg and has its upper and lower ends looped over pulleys in the usual well known manner. The shafts upon which the belt supporting pulleys are mounted are designated respectively by the numerals 6 and 7, Fig. 1. A series of conveying buckets, 8, are attached at intervals to the conveyer belt and project laterally therefrom, as shown in Fig. 1.

The improved scraper or cleaner is attached to the conveyer belt between the buckets and projects laterally therefrom, substantially as shown in Fig. 1. The scraper or cleaner preferably consists of a main or body portion, 9, which is made of leather or other suitable material and two middle reinforcing strips, 10 and 11 which extend longitudinally on opposite sides of the middle portion of the main or body member, substantially parallel to each other. The reinforcing strips are also preferably made of leather or other suitable material and are fastened permanently to the main or body member, 9, by rivets, 12, or like fasteners.

The main or body member of the scraper together with its middle reinforcing strips is permanently attached to one side of the conveyer belt so that it will extend approximately at right angles therefrom by means of angular brackets. As shown in the drawings, four of these angular brackets are employed being arranged in opposed pairs and having horizontally extending portions fastened on opposite sides of the main or body member, 9, by rivets or like fasteners 13, and their vertically extending portions fastened to the side face of the belt by rivets or like fasteners, 14. To distinguish between the angular brackets it has been thought best to give each a separate designating numeral. Referring to Fig. 3, 15 and 16 designate the lower pair of brackets and 17 and 18 the upper pair of brackets. These brackets are preferably formed of metal to insure stiffness, strength and durability of structure.

This improved scraper is so shaped, constructed and arranged that it almost fills the interior of the conveyer shaft so that as the conveyer belt travels through the shaft the edges of the main or body member of the scraper will contact with and scrape away any appreciable dirt or dust that may collect upon the interior walls of the elevator shaft. The improved scraper or cleaner also serves to destroy the eggs and larvæ of injurious or other insects within the elevator shaft and thus prevent any contamination of the grain as it passes through the shaft.

The chief advantage of this improved scraper is that it renders it unnecessary to frequently stop the conveying mechanism in its operation for the purpose of opening the shafts of the elevator leg to clean the interior walls of the same.

While metal or other material may be used to construct the main member of the scraper it is desirable to employ leather owing to its flexibility.

This improved scraper is chiefly adaptable for cleaning the interior walls of the shafts of grain elevators, but it should be noted that it may be utilized equally well for cleaning the walls of elevators for other purposes.

I claim,

An elevator shaft scraper comprising a body portion, reinforcing strips, located intermediate the side edges and on the upper and lower faces of said body portion, and a pair of angular metallic brackets adjacent the upper and lower side edges of the body portion, said brackets being adapted to be secured to an elevator belt.

HENRY FARRAR.

Witnesses:
PERCY C. SECORD,
ERNST O. SCHROEDER.